United States Patent [19]

Kirchner

[11] Patent Number: 5,412,369

[45] Date of Patent: May 2, 1995

[54] TWO-WIRE CONTROL SYSTEM

[76] Inventor: Robert D. Kirchner, 6227 Covington Way, Goleta, Calif. 93117

[21] Appl. No.: 171,828

[22] Filed: Dec. 22, 1993

Related U.S. Application Data

[63] Continuation of Ser. No. 911,014, Jul. 9, 1992, abandoned, which is a continuation of Ser. No. 593,761, Oct. 5, 1990, abandoned.

[51] Int. Cl.[6] .............................................. H04B 3/00
[52] U.S. Cl. ................................................. 340/310.03
[58] Field of Search .......... 340/310 R, 310 A, 310 CP

[56] References Cited

U.S. PATENT DOCUMENTS

| | | | |
|---|---|---|---|
| 4,592,069 | 5/1986 | Redding | 340/310 R |
| 4,636,771 | 1/1987 | Ochs | 340/310 R |
| 4,697,166 | 9/1987 | Warnagiris et al. | 340/310 R |
| 4,766,414 | 8/1988 | Shuey | 340/310 A |
| 4,885,563 | 12/1989 | Johnson et al. | 340/310 A |
| 4,949,359 | 8/1990 | Voillat | 340/310 R |

OTHER PUBLICATIONS

Ken Davidson, "Special Section: CEBus Update: More Physical Details Available," *Circuit Cellar Ink*, Jun.-/Jul. 1991, pp. 66–72.

Primary Examiner—Donnie L. Crosland
Attorney, Agent, or Firm—Merchant, Gould, Smith, Edell, Welter & Schmidt

[57] ABSTRACT

An source and load isolating device that will permit a two-wire distribution system to transmit additional signals on the same two wires that were used to supply current to electrical loads. The system simultaneously permits the status of all electrical loads to be individually monitored. Source line isolators (SLI) are used to present a high impedance between the source and line, and line load isolators (LLI) are used to present a high impedance between the line and load thereby isolating both from the two wire distribution system. Isolation timing synchronizers (ITS) coordinate the timing period of the SLI and LLI high/low impedance devices and provide timing signals for the communication or monitoring equipment. During the time the lines are used for a second signal, the electrical load is completely isolated from all other electrical interferences and their status is easily measured. Thus, when the SLI and LLI present a low impedance between the source and line, the equipment that is using the isolation advantages of the invention will have terminated the second signal or load monitoring activities, and be waiting for the next cycle control signal from isolation timing synchronizers (ITS).

9 Claims, 4 Drawing Sheets

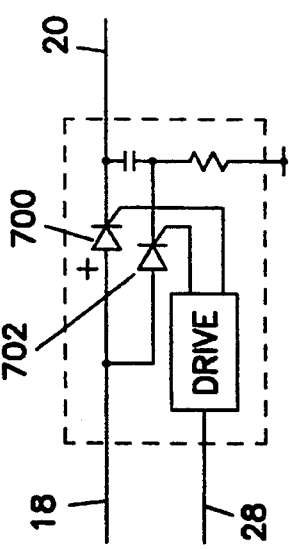
FIG. 3A
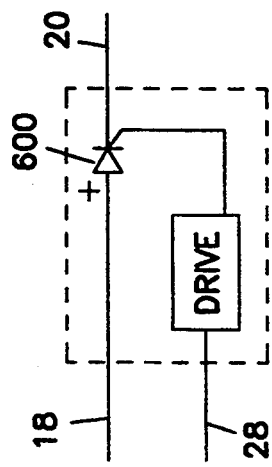
FIG. 4A
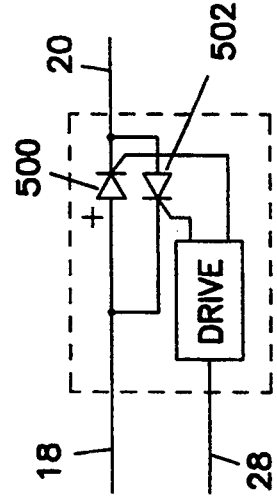
FIG. 5A
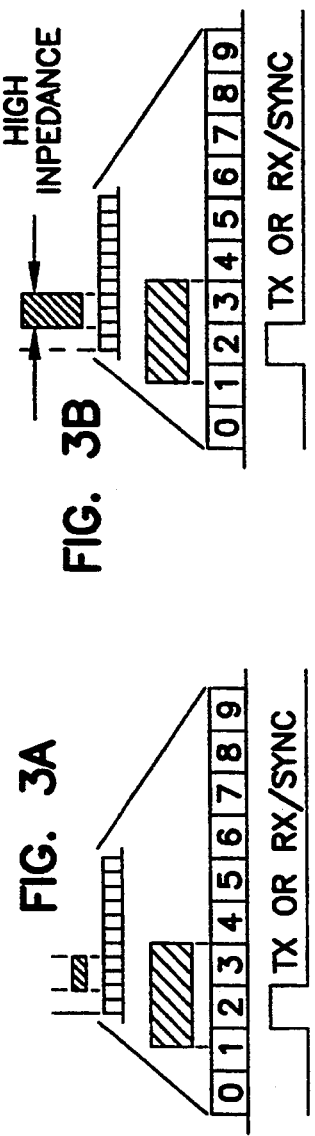
FIG. 3B
FIG. 4B
FIG. 5B
FIG. 3C
FIG. 4C
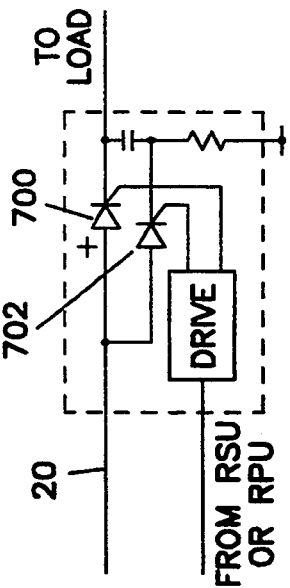
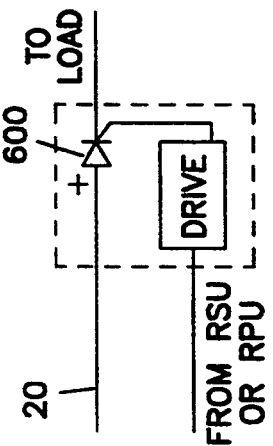
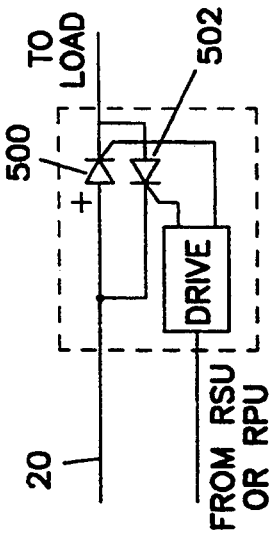
FIG. 5C

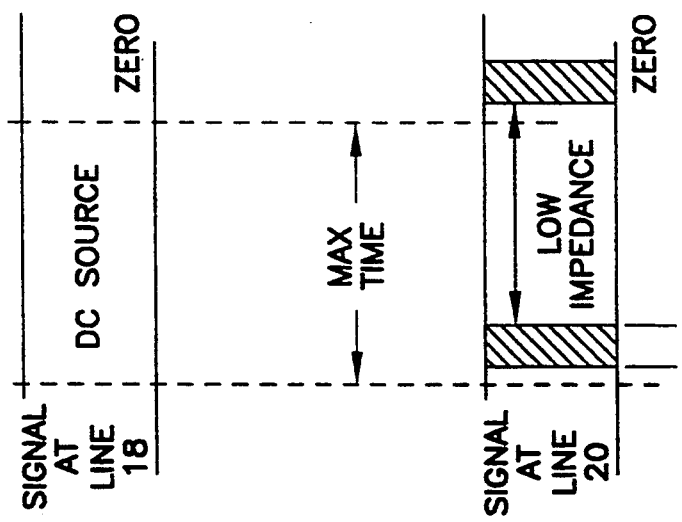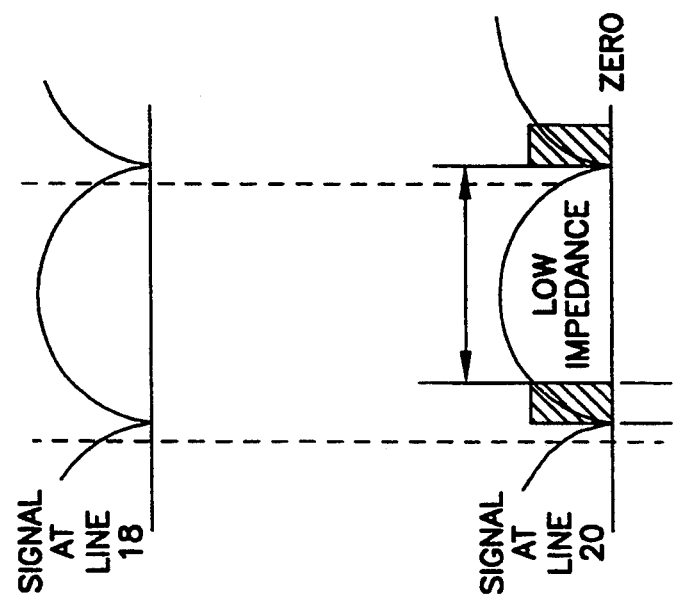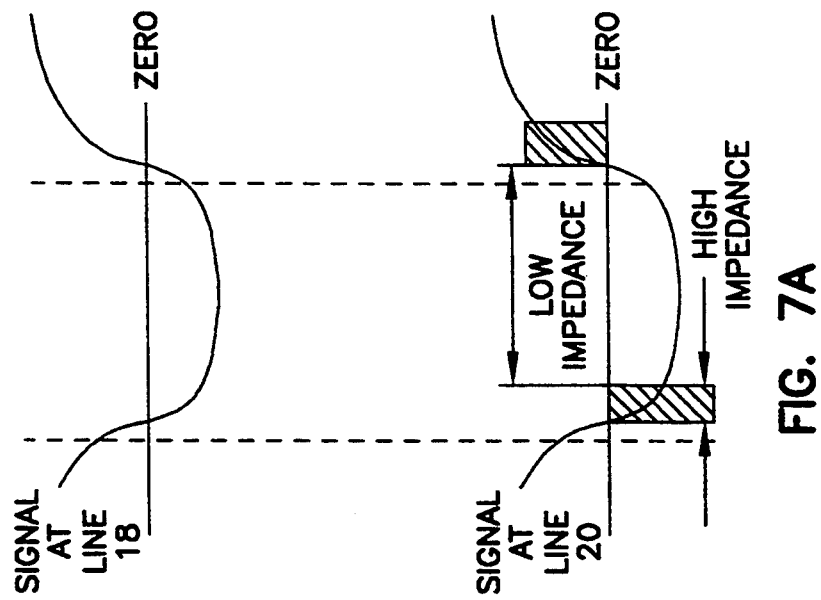

TWO-WIRE CONTROL SYSTEM

CROSS-REFERENCE TO RELATED APPLICATIONS

This application is a continuation of application Ser. No. 07/911,014, filed Jul. 9, 1992, which was a continuation of application Ser. No. 07/593,761, filed Oct. 5, 1990, both of which applications are now abandoned.

BACKGROUND OF THE INVENTION

1. Field of the Invention

This invention relates to a two-wire control system, and more specifically to a method and apparatus for isolating power distribution transmission lines from the electrical noises generated by the power source and electrical loads, thereby permitting the reliable transmission and reception of other signals during that time, and concurrently when the lines are isolated from the loads the invention, for permitting the status of the isolated electrical loads to be evaluated, irrespective of their status.

2. History of the Prior Art

The major problem associated with power line transmission Data Transmission (PLDT) and Power Line Carrier (PLC) is the simultaneous transmission of both power and signal. A typical alternating current (AC) power transmission line has a low line impedance which may vary from one to ten ohms. In addition, such lines are used to supply varying amounts of load current. However, such power transmission lines also contain the higher frequency electrical signal interference that is generated by the source and loads.

In contrast, a typical signal transmission line is set up to achieve a reliable transfer of information by obtaining the highest signal-to-noise ratio possible which occurs when the receiving amplifiers are terminated properly, and the transmitting amplifiers transmit sufficient signal power to overcome the unwanted electrical interferences.

There are two different approaches employed by PLDT and PLC to combine signal and power. One approach is to position the communication device parallel to the source and load. This parallel approach is used when a large amount of power must be transmitted because the communication device does not interfere with the low source to load line impedance. For example, U.S. Pat. No. 4,636,771, issued to Garrold W. Ochs, employed an interface circuit to effect high bridging impedances to the communication signals. U.S. Pat. No. 4,697,166, issued to Thomas J. Warnagiris et al, coupled signals by using a resonate circuit having a low loss transmitter and a high impedance receiver. U.S. Pat. No. 4,766,414, issued to Kenneth C. Shuey, provided a means for electronically tuning the circuit so that it provides a low impedance circuit path, and U.S. Pat. No. 4,885,563, issued to Richard A. Johnson et al, employed a buffer to provide a high receiving impedance and a low output drive impedance. Each of the above used a different method to modify the parallel transmitting and receiving impedances to increase the signal-to-noise ratio of their communication device.

The second method employed by PLDT and PLC to combine the fields couples the communication device in series with the source. The line and load are then coupled in series to the communication device. U.S. Pat. No. 4,592,069, issued to Robert J. Redding, employed a circuit with low resistance to direct current and high impedance for alternating signals. U.S. Pat. No. 4,949,359, issued to Jean-Pierre Voillat, used the digital signals emitted by the master station to feed power to slave stations. The standard power feed of chain repeaters for submarine cables is similar to U.S. Pat. No. 4,949,359 in that a limited amount of current is provided (under 0.5 amperes) and a source supply voltage of over 1,000 volts DC is used.

There are several disadvantages to each of the above approaches. The series approach to communication systems has limited uses because of the fixed load power requirements and the higher fixed line impedance which relates directly to the frequency response of that line. If a chain repeater has a 1 uF capacitance load at the receiving terminal and no electronic aids to boost the frequency response, the amplitude of the signal at the receiver would be less than 63% of the original transmitted signal for all frequency above 500 Hz. Thus, the series communication systems are typically used in specialized situations and require carefully designed circuits that do not change their power requirements as they age.

In addition, all PLDT and PLC devices, using either the series or the parallel method, must employ low DC/high AC impedances, high bridge impedances to communications signals, resonate circuits, electrically tuned circuits, high receiving impedances/low drive impedances, digital signals to feed power, or a constant-current source to minimize the effect of typical power transmission electrical loads and to minimize the low line impedance effects on the signal transmission.

Furthermore, accurate measurement of various line and load parameters would be very beneficial. However, the measurements must be obtained over the electronic circuits and should be repeatable at any time. In addition, a sensing device must be connected to the electronic circuit to perform the measurements. Nevertheless, if possible, the sensing device should not influence or cause any change in the component electrical characteristics which would alter the measured values. When simple sensing devices are used to accurately measure electrical loads such as resistance, capacitance and inductance, these components are isolated from all other components to eliminate any loading which would affect the measurement of the sensing device. When sense devices are used to measure electrical loads in remote locations, or where the load is an integral part of a larger system, a method is required wherein the impedance of the sense device will not affect the system operation. The method should also calculate the actual value of the load in question from the measured impedances, determine whether the load is active and determine whether the load is receiving current from the power source. Finally, the associated electrical noises generated by the source and other loads must be removed.

In summary, the simplest and most reliable measurements are obtained when the sense device does not effect the component under test and the unit under test is completely isolated from all other components and electrical interferences.

SUMMARY OF THE INVENTION

The object of this invention is to provide an electronic system by which power is supplied to electrical loads via a power line, a second signal is transmitted and received by remote devices using that power line, while the individual status of the remote loads that are connected to that power line are monitored.

A system in accordance with the principles of the present invention synchronously varies the input and output impedance of a two wire power distribution transmission line. Source line isolators (SLI) are used to present a high impedance between the source and line, and line load isolators (LLI) are used to present a high impedance between the line and load thereby isolating both from the two wire distribution system. During the time the lines are used for a second signal, the electrical load is completely isolated from all other electrical interferences and their status is easily measured. Thus, when the SLI and LLI present a low impedance between the source and line, the equipment that is using the isolation advantages of the invention will have terminated the second signal or load monitoring activities, and be waiting for the next cycle control signal from isolation timing synchronizers (ITS).

Systems in accordance with the principles of the present invention may be used in systems which require the combination of power and control, such as house wiring, and would accomplish this by replacing the fuses with SLI units to regulate the power on the distribution lines, LLI units which would regulate the various power loads, and ITS units to provide cycle timing. These units will permit the use of a simple Master Communications Unit (MCU) by eliminating or simplifying the amplitude or frequency modulating (AM or FM) communications equipment by permitting, during the high impedance time, the use of a simple DC amplitude pulse or permit the AM or FM equipment to reduce their complexity by setting the line impedance. For new house wiring, all LLI outlets are equipped with an ITS cycle counter and sync detector and set to a different count number in the sequence so as to remotely control every outlet individually by using DC amplitude sync signals to start a fixed timing sequence. This would also permit all outlets to be wired in parallel thereby eliminating the need to trace individual wires and would also reduce the total amount of wire required for each job. In older houses, a system in accordance with the principles of the present invention would increase the flexibility of existing wiring without the need of any modification, and would permit all electrical loads to be controlled and monitored from any outlet in the house.

A system in accordance with the principles of the invention would also be particularly advantageous in emergency situations when the primary source of power fails, since the SLI would disconnect the power source and the LLI would disconnect all the electrical loads, thereby permitting low powered battery backup devices such as intrusion alarms, smoke detectors or communication devices to use the high impedance lines with a minimal power drain on the batteries.

Systems in accordance with principles of the present invention may also be used to simplify telemetering control systems by combining power, sense, and control signals on a two wire interface. The value of monitoring and controlling the parameters of an electrical apparatus under actual load conditions is particularly useful, especially where catastrophic failure due to age is avoided.

For example, a telemetering control system has been developed for model railroads that will transmit, receive and process a varying amplitude pulse, and monitor the electrical loads. The electronics employ a system sync which initiates the start of a 128 Bit timing sequence used to position the transmission of signals, to and from 16 different track segments, wherein each track segment is assigned a different 8 bit sequence. The electronics for each segment contains internal logic that is manipulated by the status of selected bits from other segments or bits, transmitted by the MCU. The invention not only reduces wiring and interface problems, but offers a more realistic model railroad operation by duplicating the operation of railroads where commands are issued by the dispatcher (MCU) and the electronics are used to duplicate the function of train engineers by controlling track segments with the combination of the Remote Power Unit (RPU), Remote Sense Unit (RSU), and a Remote Communication Unit (RCU).

Finally, systems in accordance with principles of the invention may be used to simplify sense-control units such as heating and/or cooling systems wiring by combining power and signals on the same two lines. One 60 Hz, 128 bit system would be capable of monitoring 64 different temperature units every 1,137 minutes (requires 7 bits), each with a temperature range of 100° C. in 1° C. steps (requires 100 bits). In addition, 10 ON/OFF functions and status feedback indication would be provided every 1.066 seconds (requires 20 bits). The system would reduce the interface wires from 74 pairs to 1 pair, thereby simplifying the control and display panel complexity by eliminating the interface electronics.

The isolation features of the invention will be apparent from the following descriptions, figures and claims. The scope of the invention not being limited to the functions in the description, or apparatus depicted in the figures, since these are used to illustrate ways in which the method of the invention can be applied. Other embodiments of the invention utilizing the same or equivalent method may be used and functional changes may be made as desired by those skilled in the art without departing from the present invention.

BRIEF DESCRIPTION OF THE DRAWINGS

The invention may be more fully understood, and further advantages of line isolation be more apparent, from a reading of the preferred embodiment, taken with the accompanying drawings, in which:

FIGS. 3A–3C are waveforms that represent the bit timing of the isolation timing synchronizer in relation to the high impedance timing of control line and the position of the TX or RX/SYNC in the bit sequence;

FIGS. 4A–4C are schematic block diagrams of one high/low impedance device that may be used in the source line isolator (SLI), and how they are connected with three different power sources.

FIGS. 5A–5C are schematic block diagrams of one high/low impedance device that may be used in the line load isolator (LLI) units and now they are connected with three different power sources;

FIGS. 6A–6C are waveforms that represent the voltage between a power source and the return line with three different power sources; and, FIGS. 7A–7C are waveforms that represent the high and low impedance voltage cycle timing between the

DETAILED DESCRIPTION OF THE INVENTION

The present invention relates to a power distribution system in which the invention enables communication and monitoring systems to function more efficiently and to operate via the same two wires which were used to distribute the power. The invention is an apparatus which can be used with any number of variations or combinations of power sources, communication, command, control, and sense systems.

Figure 1:
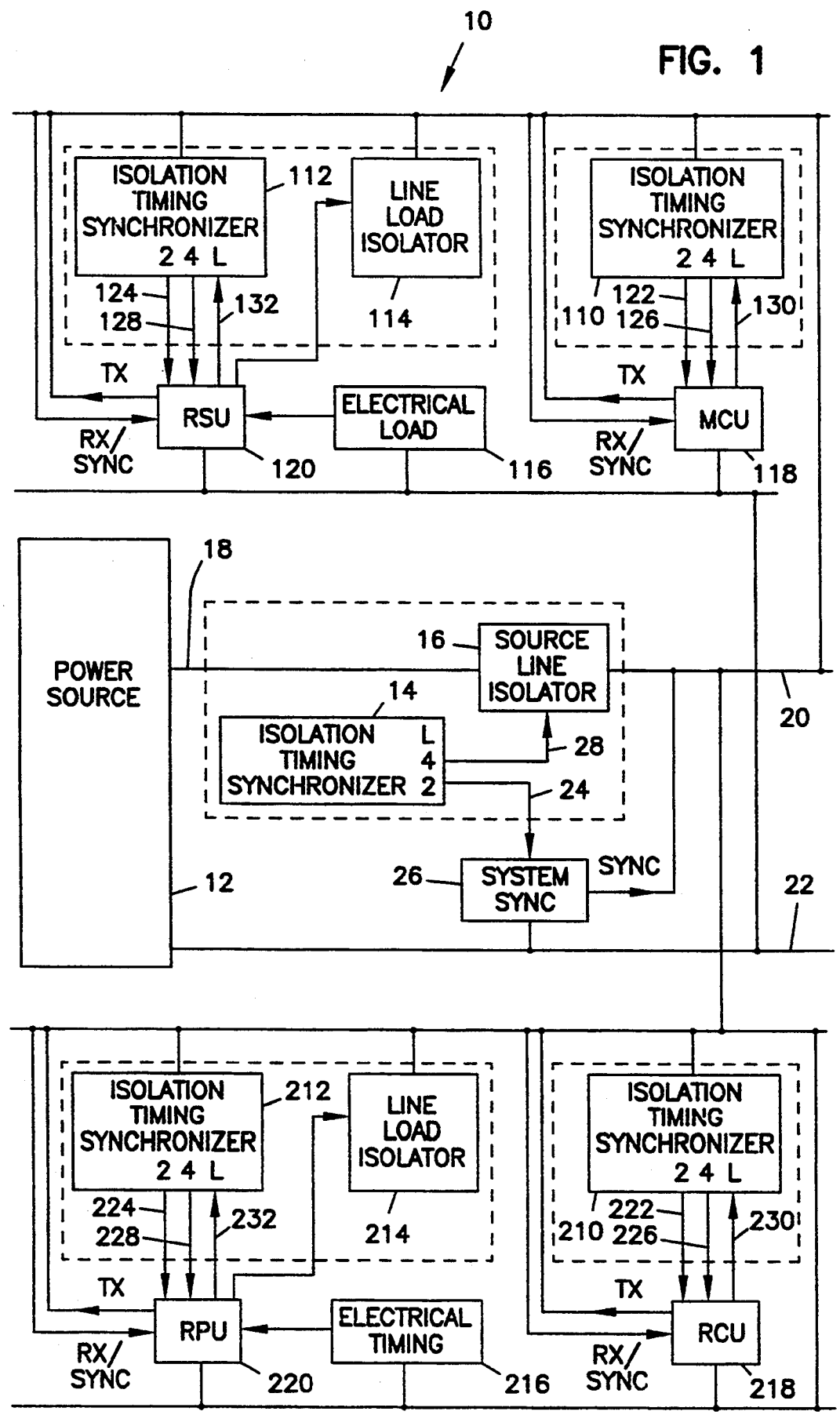
FIG. 1 is a schematic block showing the interconnections of the various components of a two-wire control system according to the invention.

A two-wire control system 10 in accordance with the invention is shown in FIG. 1. Power source 12 is connected to ITS 14 and one side of SLI 16 by line 18. The invention transmission line 20 is connected to the other side of SLI 16, ITS's 110, 112, 210, 212, and LLI's 114, 214. LLI's 114, 214 are also connected to the electrical loads 116 and 216. Finally, electrical loads 116, 216 are connected to return line 22 which leads back to power source 12. This series sequence (power source 12, SLI 16, transmission 20, LLI 114, 214, loads 116 and 216) places SLI 16 between transmission line 20 and power source 12, which for a predetermined time isolates power source 12 from transmission line 20. Likewise, LLI's 114, 214 isolate loads 116, 216 from transmission line 20. ITS 14 will generate two signals: a system control timing signal 24 which is sent to system sync 26, and a high/low impedance cycle timing signal 28 which is sent to SLI 16.

ITS 110 and 112 is connected to transmission line 20, MCU 118, and RSU 120. ITS 110, 112 each generate two signals to MCU 118 and RSU 120 respectively: receive or transmit cycle timing 122, 124 and high/low impedance cycle timing 126, 128. The ITS's 110, 112 also receive a signal from MCU 118 and RSU 120. MCU 118 and RSU 120 each generate a DC sync timing signal 130, 132 respectively, which is sent to ITS 110, 112. Likewise ITS's 210, 212 each generate two signals which are sent to RCU 218 and RPU 220. ITS's 210, 212 send a receive and transmit cycle timing 222,224 respectively to RCU 218 and RPU 220. In addition, ITS's 210, 212 send a high/low impedance cycle timing 226, 228 to RCU 218 and RPU 220 respectively. RCU 218 and RPU 220 generate DC sync timing signals 230, 232, which are sent to ITS's 210, 212 respectively.

During a high impedance state, system sync 26 will apply a timing signal which is decoded by MCU 118, RSU 120, RCU 218 and RPU 220 in order to generate the sync signal used to initiate their system timing sequence. The system timing sequence enables MCU 118, RSU 120, RCU 218 and RPU 220 to communicate at their respective timing intervals, and also when the power source 12 has no voltage fluctuation, to reset all ITS cycle timing via signals 130, 132, 230 and 232 in order to maintain the proper phase of the high/low impedance cycle timing received by MCU 118, RSU 120, RCU 218 and RPU 220 from ITS's 110, 112,210, 212 via signal paths 126, 128, 226, and 228 respectively.

RSU 120 is used to evaluate and control electrical load 116 and to transmit, during the high impedance period, the status of the load 116 via transmission line 20 to MCU 118. RPU 220, as commanded by MCU 118, is used to control the power delivered to electrical load 216 by regulating the OFF/ON cycle timing of the associated LLI 214. RSU 120, RPU 220 and electrical loads 116 and 216 are compatible with the internal high/low device performance of SLI 16 and LLI's 114, 214 in order to maintain efficient transmission of the second signal, load sensing and power transfer. MCU 118 and RCU 218 are used for commands, control, communications, or a combination thereof and must be compatible with the high line impedances of SLI 16 and LLI's 114, 214 for best signal-to-noise ratio.

Figure 2:
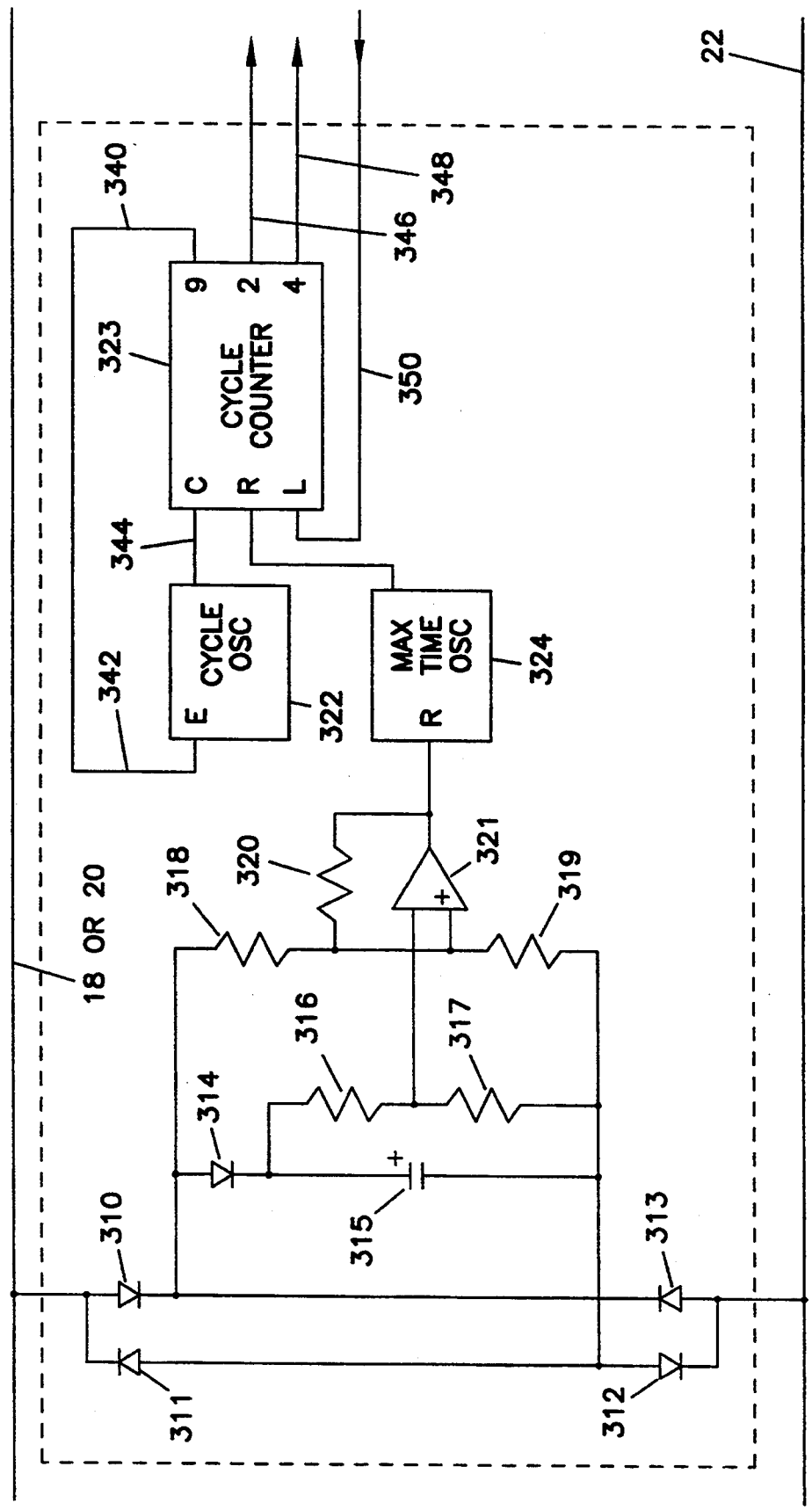
FIG. 2 is a schematic block diagram representation of an isolation timing synchronizer (ITS) used in a two-wire control system.

FIG. 2 illustrates a schematic block diagram of the isolation timing synchronizer (ITS) 14, 110, 112, 210, 212. This embodiment of the ITS is not meant to limit the scope of the invention but only to demonstrate how one type of ITS design could be used for both isolation of lines 18 and 20 and would be capable of operating with at least three different types of power sources 12. The ITS's 14, 110, 112, 210, 212 consist of an amplitude detector circuit comprising components 310–321, a cycle oscillator 322, a cycle counter 323, and a max time oscillator 324. The amplitude detector circuit illustrated in FIG. 2 consists of diodes 310, 311, 312, 313 which form a rectifier bridge connected across line 18 and 22 in the case of an ITS 14, and across transmission line 20 and return line 22 in the case of ITS's 110, 112,210,212. Diode 314 conducts and charges capacitor 315 to the voltage supplied by power source 12. The peak voltage on capacitor 315 is always a fixed percent of the power source 12 voltage. Thus, the peak voltage on capacitor 315 is divided by resistor network 316, 317 which provides a varying reference point voltage at the negative input of the voltage comparator 321.

The positive input of the voltage comparator 321 is connected to feedback resistor 320 and resistor divider 318, 319. The positive input of the voltage comparator is also at a fixed percent of the input power source 12 voltage as sensed at the anode of diode 314. Thus, the cycle timing remains constant under adverse conditions.

For a fixed power source frequency, the voltage variations due to loading and line drops are cancelled and the voltage comparator 321 output has a constant phase relation to the input power source 12. For a varying input power source 12 frequency, the output of the voltage comparator 321 is a constant percent of that input frequency. The illustrated circuit of FIG. 2 can also be used when an ITS is incorporated into the design of MCU 118, or RSU 120, RCU 218, and RPU 220 in order to decode the amplitude varying sync and receive signals which are gated with the timing pulses 122, 124, 222, and 224 respectively. The output of voltage comparator 321 changes at bit zero, as illustrated in FIGS. 3A–3C, and is connected to the reset input of the max time oscillator 324. When the system does not require DC operation max time oscillator 324 may be deleted.

The frequency of max time oscillator 324 must be lower than the lowest anticipated power source 12 frequency. Therefore, with an input from the alternating current (AC) power source 12, the max time oscillator 324 is reset before its internal timing is reached, and the output used to reset the cycle counter 323. Thus, the max time oscillator 324 will always be in phase with the input power source 12 voltage. The function of max time oscillator 324 is used to reset the cycle counter 323 when the main source fails and a backup DC source is substituted, or when power source 12 is DC.

When the cycle counter 323 is reset, output 340, which is connected to the cycle oscillator 322 enable 342, changes and enables cycle oscillator 322 which supplies pulses back to the cycle counter 323 clock input 344. Cycle counter 323 will count nine pulses then output nine changes in cycle oscillator 322 as illustrated in FIGS. 3A–3C. ITS 14 signal 24 corresponds to the bit 2 output 346 of cycle counter 323 that is connected to system sync 26 to maintain the system timing. ITS signal 28 corresponds to the bit 4 output 348 of cycle counter 323 which initiates the start of the system low impedance cycle timing for SLI 16 to control transmission line 20. The third port of the ITS 14 is not used.

With respect to ITS 110, 112, 210, and 212, outputs 122, 124, 222, and 224 are used to synchronize the receive, transmit, and sync timing with AC sources 12 and correspond to signal 346 in FIG. 2. ITS outputs 126, 128, 226, and 228 correspond to signal 348 in FIG. 2 and are used to provide the slaved high/low impedance timing. Inputs 130, 132, 230, and 232 to ITS 110, 112, 210, 212 correspond to cycle counter 323 low (L) 350 which is the decoded sync signal from units 118, 120, 218, and 220. Signal 350 will inhibit cycle counter 323 until units 118, 120, 218, and 220 receive a signal from system sync 26. The signal 350 from system sync 26 is the starting point for the cycle counter 323 output signals 126, 128, 226, and 228 of ITS 110, 112, 210, 212 for a DC source high/low impedance cycle as illustrated in FIGS. 3C and 7C.

FIGS. 4A–4C illustrate high/low impedance, silicon controlled rectifiers devices (SCR's) that can be used with the SLI 16 to connect power source 12 from line 18 to transmission line 20. Alternatively, FIGS. 5A–5C illustrate how the device can be used with the LLI's 114, 214 to connect transmission line 20 to electrical loads 116, 216 respectively. Circuit drive signals 348 are initiated from ITS's 110, 112, 210, 212, and line power is controlled by LLI's 114, 214 for each of the power sources 12 depicted in FIGS. 6A–6C. Note that the additional components must be employed to protect the silicon controlled rectifier or in the event that reactive loads are used. Furthermore, utilization of silicon controlled rectifiers is not meant to limit the invention to such devices but to show one embodiment for altering the impedance. Silicon controlled rectifiers have a low impedance and will maintain that state until there is insufficient holding current through the device. This occurs near or at the zero voltage points. At that point the device will reset automatically to a high impedance.

Full wave application, as illustrated in FIG. 4A and FIG. 5A, contains two parallel SCR's where SCR 500 conducting as commanded when the source voltage is above zero and changing to a high impedance when the voltage approaches zero. SCR 502 conducts as commanded when the source voltage is below zero and goes to a high impedance when the voltage approaches zero as illustrated in FIG. 7A.

Half-wave application, as illustrated in FIG. 4B and FIG. 5B, contains one parallel SCR. SCR 600 conducts as commanded when the voltage is above zero and will go to a high impedance as the conducting current drops below the required holding value, i.e., the source voltage near zero, as illustrated in FIG. 7B.

DC commutation application, as illustrated in FIG. 4C and FIG. 5C, contains two parallel SCR's 700, 702. SCR 700 conducts as commanded and resets to a high impedance when SCR 702 is commanded On, which thereby reduces SCR 700 current below the required holding level and completes the high/low cycle as illustrated in FIG. 7C.

Although silicon controlled rectifiers are used to teach how the invention can use the principles of the forward to reverse impedance change associated with semiconductors, and to demonstrate the simplicity of design required to obtain the high/low impedance required for the invention to operate, other embodiments in accordance with the invention can be used depending upon the type of impedance device required. Field effect transistors (FETs), transistors, SCRs, diodes, and/or relays may be required to obtain the impedances and power requirements needed for the total system operation.

Further embodiments in accordance with the teaching of the invention will permit the combination of PLDT, PLC and data remote sensing and offer the advantages of simplicity over previous associated circuits in the following manner. Referring now to FIG. 1, the SLI will eliminate all unwanted interferences now associated with the source supply 12 and isolate supply 12 from two-wire transmission lines 20, 22 during the second signal transmission. LLI's 114, 214 isolate loads 116, 216 from two-wire transmission lines 20, 22 during the second signal transmission, thereby eliminating all unwanted interferences associated with these loads 116, 216 from the lines 20, 22, and at the same time permitting these loads 116, 216 to be monitored without interference from the second signal transmission. The two-wire transmission lines 20, 22 can be terminated by enabling the RCU 218 in order to establish the best signal-to-noise ratio (i.e. 50 ohm, 300 ohm, 600 ohm . . . ) during the time source 12 and loads 116, 216 are disconnected from lines 20, 22. Further, when load 116 is disconnected from lines 20, 22, RSU 120 is enabled so as to interrogate and evaluate how load 116 is operating under actual loading conditions (i.e. motor speed, heater temperature, etc.). Finally, costs are reduced by simplifying the wiring, enabling backup equipment to be employed, and reducing complexity of monitoring communication equipment.

What is claimed is:

1. A two wire control system, comprising:
   a source line isolator alternating between a high impedance state and a low impedance state, coupled at a first end to a power source and at a second end to at least one transmission wire, for isolating the power source from the transmission wire while in the high impedance state;
   a line load isolator alternating between a high impedance state and a low impedance state, coupled at a first end to the transmission wire and at a second end to at least one load, for isolating the transmission wire from the load while in the high impedance state; and
   means, coupled to the line load isolator, for synchronizing the high and low impedance state of the line load isolator with the source line isolator.

2. The two wire control system of claim 1 further comprising communication means, coupled to the transmission wire between the source line isolator and the line load isolator, for sending communication signals over the transmission wire.

3. The two wire control system of claim 1 further comprising sensing means, coupled to the line load isolator and a load, for monitoring the status of the load and the transmission wire.

4. The two wire control system of claim 1 further comprising remote power means, coupled to the line load isolator, for controlling the power delivered to the load.

5. The two wire control system of claim 4 wherein the synchronizing means further comprises means for providing timing signals to the communication means, the sensing means and the remote power means.

6. The two wire control system of claim 1 wherein the synchronizing means generates a system control timing signal for controlling the impedance of the source line isolator, the source line isolator generating and a high/low impedance cycle timing signal for controlling the impedance of the line load isolator in response to receiving the system control timing signal.

7. A two wire control system, comprising:
a source line isolator selectively alternating between a high impedance state and a low impedance state, coupled at a first end to a power source and at a second end to at least one transmission wire, for isolating the power source from the transmission wire while in the high impedance state;
a line load isolator selectively alternating between a high impedance state and a low impedance state, coupled at a first end to the transmission wire and at a second end to at least one load, for isolating the transmission wire from the load while in the high impedance state;
communication means, coupled to the transmission wire between the source line isolator and the line load isolator, for sending communication signals over the transmission wire;
sensing means, coupled to the line load isolator and a load, for monitoring the status of the load and the transmission wire; and
means, coupled to the line load isolator, for synchronizing the high and low impedance state of the line load isolator with the source line isolator.

8. The two wire control system of claim 7 wherein the synchronizing means generates a system control timing signal for controlling the impedance of the source line isolator, the source line isolator generating and a high/low impedance cycle timing signal for controlling the impedance of the line load isolator in response to receiving the system control timing signal.

9. A two wire control system, comprising:
a source line isolator alternating between a high impedance state and a low impedance state, coupled at a first end to a power source and at a second end to at least one transmission wire, for isolating the power source from the transmission wire while in the high impedance state;
a line load isolator alternating between a high impedance state and a low impedance state, coupled at a first end to the transmission wire and at a second end to at least one load, for isolating the transmission wire from the load while in the high impedance state;
first synchronizing means, coupled to the power source, for generating a system control timing signal for controlling the impedance of the source line isolator, the source line isolator generating and a high/low impedance cycle timing signal for controlling the impedance of the line load isolator in response to receiving the system control timing signal;
remote sense means, coupled to the line load isolator and a load, for evaluating electrical loads;
remote power means, coupled to the line load isolator, for controlling the power delivered to the load;
remote communication means, coupled to the transmission wire, for sending communication signals over the transmission wire;
master control unit, coupled to the transmission wire, for controlling the remote sensing means, the remote power means and the remote communication means; and
second synchronizing means, coupled between the first synchronizing means and the transmission wire, for generating timing signals and for generating high/low impedance cycle timing, the timing signals and the high/low impedance cycle time signals being transmitted to the master control unit, the remote sensing means, the remote power means and the remote communication means.

* * * * *